United States Patent [19]
Lyckberg

[11] Patent Number: 5,259,263
[45] Date of Patent: Nov. 9, 1993

[54] LINK SYSTEM FOR TRANSMISSION OF GEARCHANGE MOVEMENTS BETWEEN A VEHICLE'S GEAR LEVER AND GEARBOX

[75] Inventor: Mats Lyckberg, Uddevalla, Sweden
[73] Assignee: Saab Automobile Aktiebolag, Sweden
[21] Appl. No.: 883,190
[22] Filed: May 15, 1992

[30] Foreign Application Priority Data
May 21, 1991 [SE] Sweden .................. 9101518

[51] Int. Cl.$^5$ .................... F16H 59/04; F16D 3/68
[52] U.S. Cl. ............................ 74/473 R; 74/96; 464/89
[58] Field of Search ............... 74/96, 473 R; 464/89, 464/92

[56] References Cited

U.S. PATENT DOCUMENTS

| | | | |
|---|---|---|---|
| 3,550,467 | 12/1970 | Forichon | 74/473 R |
| 3,613,474 | 10/1971 | Baumgartl | 74/473 R X |
| 3,645,145 | 2/1972 | Galas | 74/473 R |
| 4,872,361 | 10/1989 | Muller | 464/87 X |

FOREIGN PATENT DOCUMENTS 2215285 10/1973 Fed. Rep. of Germany .... 74/473 R

*Primary Examiner*—Allan D. Herrmann
*Attorney, Agent, or Firm*—Ostrolenk, Faber, Gerb & Soffen

[57] ABSTRACT

Link system for movement transmission between a gear lever and a gearbox in a vehicle, whereby the link system is coupled between a shift rod (2) and a gearchange shaft (4) which extends into the gearbox and whose bearing therein is arranged to absorb bending moments. The end of the shift rod (2) adjacent to the link system is supported by a journal bearing (32) mounted on the gearbox, and the link system includes a rigid planar link element (8), which at its opposing ends has parallel rotary articulations (14,30; 16,24) whereby the link element is coupled at one end to a crank (6) connected to the shift rod, and at the other end to a crank (10) fixed to the gearchange shaft (4).

15 Claims, 4 Drawing Sheets

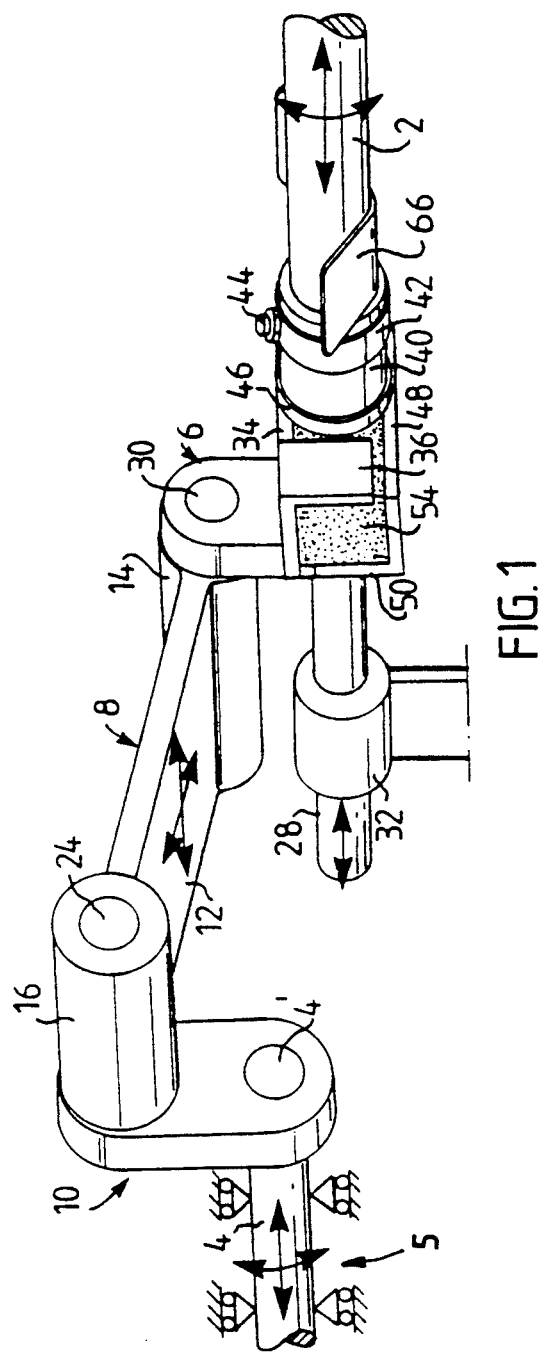

LINK SYSTEM FOR TRANSMISSION OF GEARCHANGE MOVEMENTS BETWEEN A VEHICLE'S GEAR LEVER AND GEARBOX

BACKGROUND OF THE INVENTION

The present invention refers to a link system for transmission of gearchange movements between a gear lever and a gearbox in a vehicle whereby the link system is coupled between a shift rod which constitutes the system's movement-transmission input part and a gearchange shaft which constitutes the system's movement-transmission output part and extends into the gearbox.

Various types of systems and mechanisms are previously known for transmitting gearchange movements between a vehicle's gear lever and gearbox. They involve the driver operating the gear lever, which is coupled to and controls the movement of a shift rod which then in its turn operates, via a mechanism or a link system, a gearchange shaft which extends into the gearbox.

In modern cars with five-speed gearboxes the gearchange movement which can thus be transmitted from the shift rod to the gearchange shaft is a composite movement consisting partly of a pure axial displacement movement in the shift rod's longitudinal direction and partly of a rotary movement of the shift rod.

In many vehicle designs it is impossible, inter alia for space reasons and because of the placing of the parts involved, for this movement transmission to take place in a direct and straight manner between shift rod and gearbox and it has to take place via a special link mechanism between the shift rod and the gearbox's gearchange shaft. A common feature of these known designs with such intermediate link mechanisms is that they are complicated in structure and expensive to manufacture because of their many constituent parts.

SUMMARY OF THE INVENTION

The object of the present invention is to achieve a new and constructionally simpler type of such link system between shift rod and gearchange shaft. This involves endeavouring to have as few constituent parts and articulation points as possible in the link system. It is also desirable for the link system to be functionally simple and capable of being assembled quickly and for it to be so designed as to make it easy to install the engine unit with associated gearbox and link system from beneath the vehicle and up into the intended mounting position and in connection with the shift rod already prefitted to the vehicle.

The aforesaid object is achieved according to the invention in that the bearing of the gearchange shaft (4) in the gearbox is arranged to absorb bending moments, preferably by being a two-point bearing, that the end of the shift rod (2) adjacent to the link system is supported by a journal bearing (32) mounted on the drive unit, that the link system comprises a link mechanism with a rigid and at least substantially planar link element (8) which is provided at a pair of opposite ends with rotary articulations (14, 30; 16, 24) with mutually parallel rotation spindles (30; 24), articulations by which the link element (8) is coupled at one end to a crank (6) which is connected, preferably elastically, to the shift rod (2), and at the other end to a crank (10) fixed to the gearchange shaft (4).

A link system of this kind has only three articulation points, namely one at the crank of the gearchange shaft and two at the crank which is placed at the end of the shift rod. The fact that the bearing of the gearchange shaft in the gearbox absorbs bending moments (by being a two-point bearing) means that the link system can be controlled by spindles which are parallel to the gearchange shaft. No problems arise in this way with tolerances or insufficient parallelism, since only the gearchange shaft is directionally determinant.

The particular unique feature of the link system according to the invention is that just one link mechanism part, namely the planar link element, is required and is sufficient to transmit both the axial movement and the radial movement (rotary movement) from the shift rod to the gearchange shaft which is aligned parallel with it.

As the two rotary joints of the link element, i.e. the crank connections, have only one degree of movement freedom, namely rotation, and as the rotation spindles are parallel, both axial movement and rotary movement can be transmitted. The rigid link element is designed for maximum rigidity in both of the directions of displacement which apply to it (i.e. in its planar plane), either because of the crank movement or because of the axial displacement movement caused by the shift rod.

The link system according to the invention thus has few constituent parts and is functionally simple and also easy to assemble, which makes it particularly advantageous in today's constructionally "tightly packed" cars in which the gearshift has to pass the accelerator rack, which obstructs a direct straight movement transmission between gear lever (shift rod) and gearbox (gearchange shaft).

The use of cranks for rotary movement transmission between the shift rod and the gearchange shaft makes it easy, by suitable choice of respective crank lengths, to achieve desired "step-down" from the shift rod's rotary movement to a smaller rotary movement of the gearchange shaft. This is advantageous, since it is desirable for there to be relatively large gear lever movements (shift paths) clearly perceptible to the driver (and correspondingly relatively great rotary movements of the shift rod), whereas significantly smaller rotary movements are sufficient and desirable for the gearchange shaft in the gearbox.

The link systems has a number of features described in detail below. These features include a particular shape for the link element of the link system and include the rotative connection between the first crank connected with the shift rod and the second crank connected with the gearchange shaft. An elastic element is disposable between the link at the first crank, on the one hand, and the shift rod at the first crank, on the other hand, to damp transmission of vibration to the shift rod, and to some extent allow obliqueness of one element with respect to the other there. Means are also described for attaching the ends of the shift rod to the link system.

The invention will now be explained below and described in greater detail with reference to an embodiment example, shown in the accompanying drawings, of the link system according to the invention.

The drawings show the following:

BRIEF DESCRIPTION OF THE DRAWINGS

FIG. 1 shows schematically and in perspective a link system according to the invention which is operative between input shift rod and output gearchange shaft;

DESCRIPTION OF THE PREFERRED EMBODIMENT

Figure 2B:
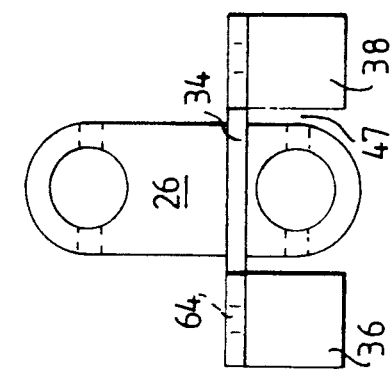
FIGS. 2A, 2B and 2C respectively show a side view, an end view and a plan view of the link system's crank connected to the end of the shift rod.

FIG. 1 shows schematically a link system according to the invention which is intended to transmit gearchange movements (in the form of axial displacement movements and/or rotary movements) from a shift rod 2 operated by the driver (by means of a gear lever not shown) to a gearchange shaft entering the vehicle's gearbox. The link system's main components for movement transmission between the shift rod 2 and the gearchange shaft 4 comprise the primary crank 6 connected elastically to the shift rod 2, the planar link element 8 which is articulatedly connected to this crank, and the secondary crank 10 which is articulatedly connected to the link element and is non rotatably attached to the end of the gearchange shaft 4. The bearing for gearchange shaft 4 is arranged to absorb bending moments, preferably by being a two-point bearing 5.

Figure 3A:
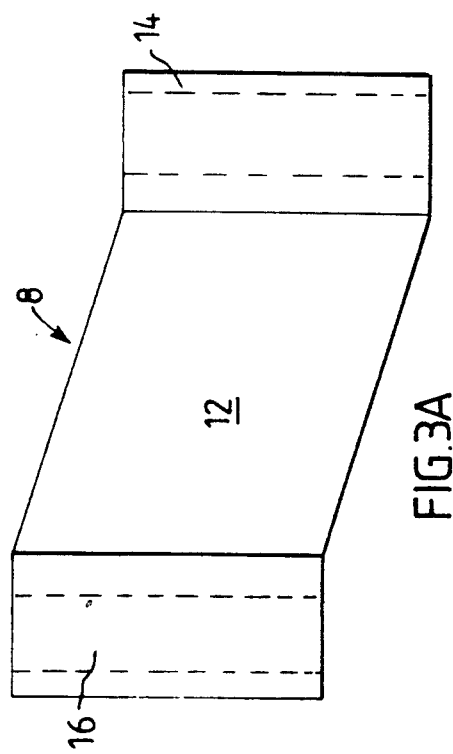
FIGS. 3A and 3B respectively show a plan view and an end view of the link system's planar link element.
Figure 3B:
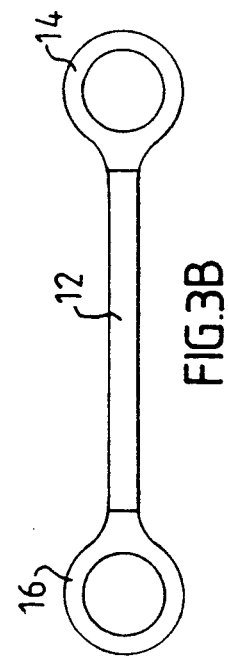

The planar link element 8 is shown in more detail in FIGS. 3A and 3B, from which it can be seen that the link element Is an even-thickness plane 12 in the shape of a parallelogram which on two of its parallel side edges is provided with mutually parallel articulation sockets 14, 16.

Figure 4B:
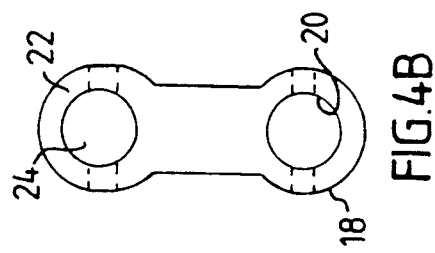
FIGS. 4A and 4B respectively show a side view and an end view of the crank fixed to the gearchange shaft.
Figure 4A:
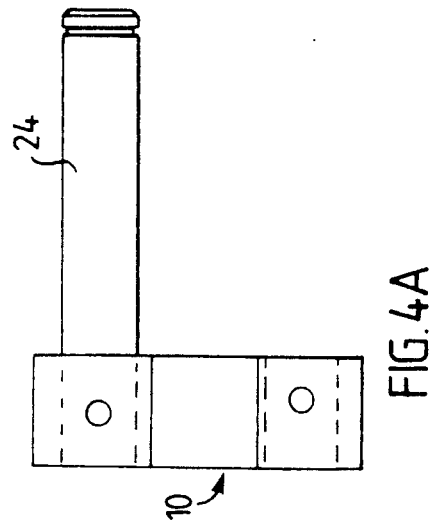

The crank 10 rigidly attached to the gearchange shaft 4 is shown in more detail in FIGS. 4A, 4B, from which it can be seen that the crank has in its lower part a socket-like portion 18 in whose hole 20 the gearchange shaft's end 4' is non rotatably fitted. The crank 10 has in its upper part a socket-like portion 22 in which is fixed an articulation pin spindle 24, which is rotatably borne in the articulation socket 16 of the link element 8.

Figure 2A:
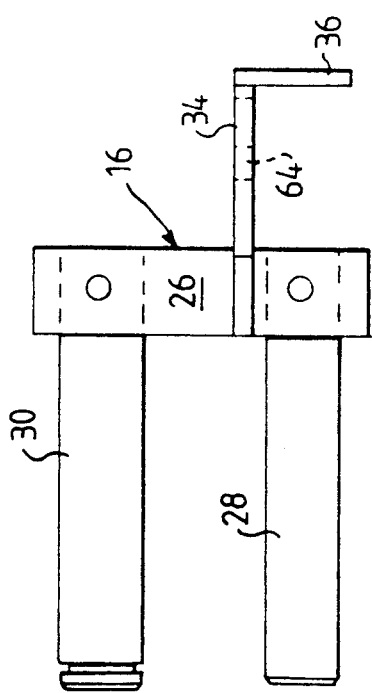
Figure 2C:
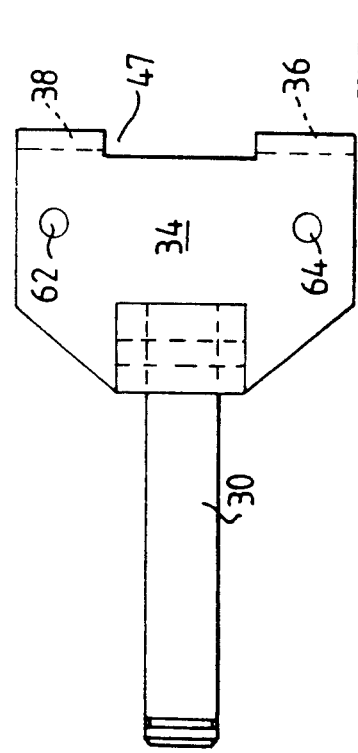

The crank 6 connected elastically to the shift rod 2 is shown in more detail in FIGS. 2A, 2B and 2C. As can be seen from these diagrams, the crank 6 includes a planar link part 26 with an articulation pin 28 projecting from its lower portion and an articulation pin spindle 30 projecting from its upper portion. The lower articulation pin 28, which is non rotatably fixed in the crank 6, is borne rotatably and displaceably in the socket-like journal bearing 32, which is rigidly mounted on the gearbox or the engine. The upper articulation pin 30 of the crank 6, which is also non-rotatably fixed in the crank, is borne rotatably in the articulation socket 14 of the link element 8. On the opposite side to the pins 28, 30, the crank 6 has a projecting bracket 34 which is provided at its outer edge with two laterally separated flange members 36, 38.

The link element 8 with the articulation sockets 14,16 may for example take the form of an integral piece of polymer material, which has the advantage of not requiring any special bearing bushes in the articulation sockets 14,16 for the articulation pins 24,30, which may be made of, for example, steel.

Regarding the socket-like journal bearing 32 mounted on the gearbox or the engine, for the indirect support of the end of the shift rod 2, it should be noted that this bearing is so designed as to create only line contact with the crank 6's articulation pin 28, which is borne therein displaceably and rotatably and thus constitutes a supporting spindle for the extension of the end of the shift rod 2. The fact that the bearing 32 thus only creates line contact with the supporting spindle or the crank pin 28 means that only radial forces can be absorbed by this journal bearing, thus permitting a certain obliqueness in this bearing.

Figure 5:
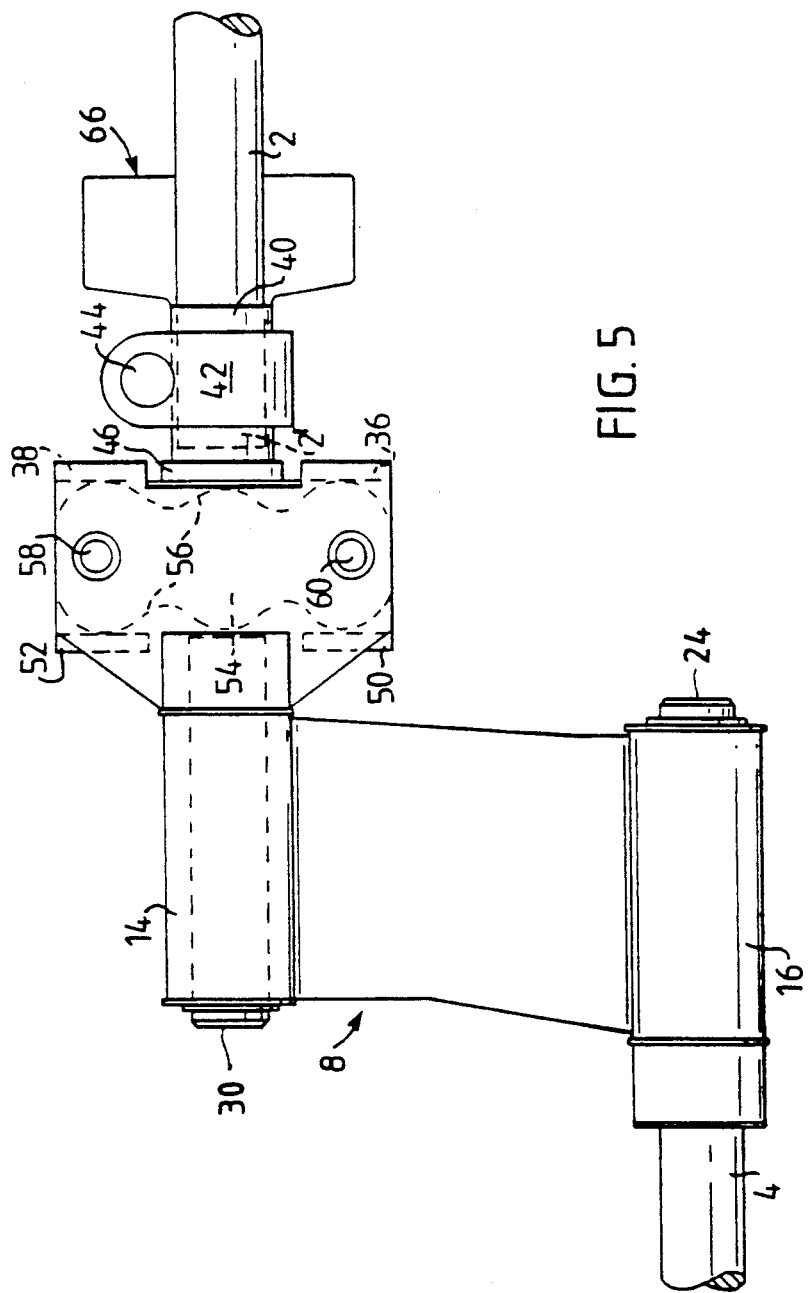
FIG. 5 finally shows a plan view of the link system according to the invention viewed at right angles to the planar link element's own plane.

As already indicated above, the primary crank 6 is not directly coupled to the end of the shift rod 2, and the connection comprises a to some extent non-rigid, elastic connection which will now be described. Reference is made here to FIG. 5, which shows the shift rod 2 ending in a cylindrical end portion 2' clamped within a socket 40 which embraces the shift rod end. The socket is clamped by means of a clamp 42 which is lockable by means of a removable screw 44. The socket 40 is rigidly connected at its forward end to a plate 46 placed in the intermediate space 47 between the two flange members 36, 38 of the bracket 34. The lower edge (see FIG. 1) of the plate 46 is rigidly secured to, or manufactured integral with, a horizontal planar carrier 48 which pushes in beneath and parallel with the bracket 34 and is provided at its forward free edge with two upwardly angled flange members 50 and 52. The bracket 34 with its two flange members 36, 38 and the plate 46 and the planar carrier 48 with its two flange members 50, 52 thus delineate between them an inner space in which is installed an elastic element 54 which may, for example, consist of a rubber pad with the shape 56 of a "waisted" 8 suggested in FIG. 5. This rubber element 54 is anchored in the bracket 34 by means of a pair of bolts 58, 60 fitted in holes 62 and 64 in the bracket 34. The rubber element 54 is thus clamped between the bracket 34 with associated flange members 36, 38, which is rigidly connected to the crank 6, and the planar carrier 48 with its respective flange members 50, 52 which is secured to the plate 46. Owing to the rubber element 54, compressive and tensile loads can thus be transmitted elastically between the shift rod 2 and the crank 6. This means in its turn that the rubber element 54 will act as a vibration damper which counteracts transmission of vibration arising from the engine or the gearbox (via the gearchange shaft 4, the crank 10, the link element 8 and the crank 6) to the shift rod 2 and therefrom on to the gear lever (not here shown) operated by the driver. The rubber element 54 thus has capacity for absorbing vibration coming from the engine, but it can also absorb such obliqueness movements as are transmitted to the crank 6 or the journal bearing 32 because of the engine tilt which occurs on acceleration.

The rubber element 54 will also be able to absorb a minor obliqueness between the shift rod 2 and the crank pin 28 which is located in the extension of the latter and forms a supporting spindle for the end bearing of the shift rod 2.

At its right end in FIG. 5, the socket 40 is provided at its lower part (in the region below the shift rod 2 in FIG. 5) with a wing-like flange portion 66 which forms an upwardly concave "cradle" to accommodate the shift rod 2 prefitted to the vehicle at the time of the installation in the vehicle from beneath of the drive unit consisting of engine, gearbox and link system, for connection to the shift rod 2.

As an alternative to the flange portion 66 to accommodate the shift rod 2 at the time of installing the drive unit, an embodiment is conceivable whereby the right end of the socket 40 ends in or merges with an end portion widened in a funnel shape wherein the end 2' of the shift rod can be accommodated and be inserted in the socket 40 during said installation.

I claim:

1. A link system for transmitting gearchange movements, the link system comprising:
    a shift rod serving as a movement transmission input part, the shift rod being moveable both axially and rotationally;
    a gearchange shaft spaced laterally from the shift rod, the gearchange shaft serving as a movement transmission output part;
    a bearing for the gearchange shaft adapted for absorbing bending moments on the gearchange shaft, the gearchange shaft being moveable longitudinally and rotationally for movement corresponding to such movement by the shift rod;
    a fixedly located journal bearing in which the shift rod is disposed for supporting the shift rod for permitting rotational movement of the shift rod in the journal bearing and permitting longitudinal shifting of the shift rod;
    a first crank connected with the shift rod for movement longitudinally and rotationally therewith; a first rotary articulation on the first crank and spaced from the shift rod;
    a second crank fixed to the gearchange shaft for movement longitudinally and rotationally therewith; a second rotary articulation on the second crank and spaced away from the gearchange shaft;
    a link element extending between the first and the second rotary articulations on the first and second cranks, respectively, the link element being substantially planar between the first and second articulations and having a width dimension extending between the first and second articulations and a length dimension extending in the direction of the first and second articulations, the link element being connected to the cranks in the manner such that longitudinal and rotational motion of the shift rod is transmitted through the first articulation into movement of the link which moves the second articulation to move the second crank to move the gearchange shaft longitudinally and rotationally corresponding to the longitudinal and rotational movement of the shift rod; and the first and second articulations comprising parallel first and second rotation spindles having respective lengths equal to the length of the link element and respectively supported on the first and second cranks and received at respective spaced apart first and second locations on the link element.

2. The link system of claim 1, wherein the first and second articulations respectively comprise parallel first and second rotation spindles supported on the first and second cranks respectively and received at spaced apart locations on the link element.

3. The link system of claim 1, wherein the bearing for the gearchange shaft is a two point bearing.

4. A link system for transmitting gearchange movements, the link system comprising:
    a shift rod serving as a movement transmission input part, the shift rod being movable both axially and rotationally;
    a gearchange shaft spaced laterally from the shift rod, the gearchange shaft serving as a movement transmission output part;
    a bearing for the gearchange shaft adapted for absorbing bending moments on the gearchange shaft, the gearchange shaft being moveable longitudinally and rotationally for movement corresponding to such movement by the shift rod;
    a fixedly located journal bearing for supporting the shift rod for rotational movement of the shift rod in the journal bearing and permitting longitudinal shifting of the shift rod;
    a first crank connected with the shift rod for movement longitudinally and rotationally therewith; a first rotary articulation on the first crank and spaced from the shift rod;
    a second crank fixed to the gearchange shaft for movement longitudinally and rotationally therewith; a second rotary articulation on the second crank and spaced away from the gearchange shaft;
    a link element extending between the first and the second rotary articulations on the first and second cranks, respectively, the link element being connected to the cranks in the manner such that longitudinal and rotational motion of the shift rod is transmitted through the first articulation into movement of the link which moves the second articulation to move the second crank to move the gearchange shaft longitudinally and rotationally corresponding to the longitudinal and rotational movement of the shift rod, the link element comprising a parallelogram shaped planar link element of essentially uniform top to bottom thickness, the respective first and second rotary articulations including first and second articulation sockets formed in the link;
    a first pin on the first crank rotatably received in the first articulation socket on the link element; and
    a second pin on the second crank rotatably received in the second articulation socket on the link element.

5. The link system of claim 4, wherein the first crank includes a main link part, the first pin of the first crank extending away from one side of the main link part;
    a third pin projecting from the one side of the main link part extending from the shift rod and comprising part of the journal bearing for the shift rod.

6. The link system of claim 5, wherein the opposite side of the main link part of the first crank carries a projecting bracket, and includes flanges at the edge of the bracket away from the main link part.

7. The link system of claim 5, wherein the shift rod extends away from another side of the main link part away from the one side thereof.

8. The link system of claim 7, further comprising a projecting flange portion supported at the end of the shift rod which is toward the first crank for setting the position of the end portion of the shift rod as it is connected to the first crank.

9. The link system of claim 5, further comprising the shift rod having an end which is toward the first crank and at another side of the first crank away from the one side;
    a clampable end socket at the first crank which is clampable to the shift rod, the end socket including a projecting flange which accommodates the end of the shift rod for setting the position of the end of the shift rod at the first crank.

10. The link system of claim 9, wherein the end of the shift rod toward the first crank includes an end socket having a first end plate; the first pin of the first crank also having a second end plate, which is spaced from the first end plate of the socket, such that the first and second end plates are moveable with respect to each other; vibration absorbing means between the first and second end plates.

11. The link system of claim 6, further comprising an end socket at the first crank and the shift rod ending at the end socket and the third pin continuing the shift rod; the end socket having an end plate, and a carrier extending away from the end plate and from the end of the shift rod;
- raised second flanges on the carrier and spaced away from the end of the shift rod while the first mentioned flanges on the bracket of the main link part are closer to the end of the shift rod;
- vibration absorbing means between the flanges on the first crank and the flanges on the carrier for absorbing vibration of the first crank to avoid transmission of the vibration to the shift rod.

12. The link system of claim 11, wherein the vibration absorbing means comprises a vibration absorbing elastic element in contact with the flanges on the carrier and the flanges on the first crank.

13. A link system for transmitting gearchange movements, the link system comprising:
- a shift rod serving as a movement transmission input part, the shift rod being moveable both axially and rotationally;
- a gearchange shaft spaced laterally from the shift rod, the gearchange shaft serving as a movement transmission output part;
- a bearing for the gearchange shaft adapted for absorbing bending moments on the gearchange shaft, the gearchange shaft being moveable longitudinally and rotationally for movement corresponding to such movement by the shift rod;
- a fixedly located journal bearing for supporting the shift rod for rotational movement of the shift rod in the journal bearing and permitting longitudinal shifting of the shift rod;
- a first crank elastically connected with the shift rod for movement longitudinally and rotationally therewith, the elastic connection rod permitting some relative motion between the first crank and the shift rod while the first crank rotates with and moves longitudinally with the shift rod; a first rotary articulation on the first crank and spaced from the shift rod;
- a second crank fixed to the gearchange shaft for movement longitudinally and rotationally therewith; a second rotary articulation on the second crank and spaced away from the gearchange shaft; and
- a link element extending between the first and the second rotary articulations on the first and second cranks, respectively, the link element being connected to the cranks in the manner such that longitudinal and rotational motion of the shift rod is transmitted through the first articulation into movement of the link which moves the second articulation to move the second crank to move the gearchange shaft longitudinally and rotationally corresponding to the longitudinal and rotational movement of the shift rod.

14. The link system of claim 13, wherein the shift rod extends toward the first crank; first end means on the shift rod and moveable therewith; second end means on the first crank and moveable therewith and vibration absorbing means between the first and second end means, so that vibration of the first crank is absorbed without transmission of the vibration to the shift rod.

15. A link system for transmitting gearchange movements, the link system comprising:
- a shift rod serving as a movement transmission input part, the shift rod having an extension pin and being moveable both axially and rotationally;
- a gearchange shaft spaced laterally from the shift rod, the gearchange shaft serving as a movement transmission output part;
- a bearing for the gearchange shaft adapted for absorbing bending moments on the gearchange shaft, the gearchange shaft being moveable longitudinally and rotationally for movement corresponding to such movement by the shift rod;
- a fixedly located journal bearing in which the shift rod extension pin is disposed for permitting rotational movement of the shift rod in the journal bearing and permitting longitudinal shifting of the shift rod, the journal bearing for the shift rod extension pin being shaped and sized to receive the shift rod extension pin and to provide only line contact for the part of the shift rod extension pin in the journal bearing; the shift rod extension pin serving as a pin of the first crank about which the first crank is rotatable, and the journal bearing thereby being able to absorb radial forces while permitting the longitudinal shifting of the shift rod extension pin in the journal bearing;
- a first crank connected with the shift rod for movement longitudinally and rotationally therewith; a first rotary articulation on the first crank and spaced from the shift rod;
- a second crank fixed to the gearchange shaft for movement longitudinally and rotationally therewith; a second rotary articulation on the second crank and spaced away from the gearchange shaft; and
- a link element extending between the first and the second rotary articulations on the first and second cranks, respectively, the link element being connected to the cranks in the manner such that longitudinal and rotational motion of the shift rod is transmitted through the first articulation into movement of the link which moves the second articulation to move the second crank to move the gearchange shaft longitudinally and rotationally corresponding to the longitudinal and rotational movement of the shift rod.

* * * * *